US012609880B2

(12) United States Patent
Du Breuil et al.

(10) Patent No.: US 12,609,880 B2
(45) Date of Patent: Apr. 21, 2026

(54) INTEGRATED NETWORK EVALUATION TROUBLESHOOTING TOOL

(71) Applicant: ARRIS Enterprises LLC, Suwanee, GA (US)

(72) Inventors: Thomas L. Du Breuil, Ivyland, PA (US); Robert S. Heiman, Warrington, PA (US); Joseph Wilson Monaco, Cary, NC (US)

(73) Assignee: ARRIS Enterprises LLC, Horsham, PA (US)

( * ) Notice: Subject to any disclaimer, the term of this patent is extended or adjusted under 35 U.S.C. 154(b) by 505 days.

(21) Appl. No.: 18/114,649

(22) Filed: Feb. 27, 2023

(65) Prior Publication Data

US 2023/0327970 A1 Oct. 12, 2023

Related U.S. Application Data

(60) Provisional application No. 63/314,442, filed on Feb. 27, 2022.

(51) Int. Cl.
| | |
|---|---|
| *H04L 12/00* | (2006.01) |
| *H04L 43/04* | (2022.01) |
| *H04L 43/0852* | (2022.01) |
| *H04L 43/106* | (2022.01) |
| *H04L 49/9023* | (2022.01) |

(52) U.S. Cl.
CPC .......... *H04L 43/0858* (2013.01); *H04L 43/04* (2013.01); *H04L 43/106* (2013.01); *H04L 49/9023* (2022.05)

(58) Field of Classification Search
CPC ... H04L 43/0858; H04L 43/04; H04L 43/106; H04L 49/9023; H04L 43/087

USPC .......................................................... 370/252
See application file for complete search history.

(56) References Cited

U.S. PATENT DOCUMENTS

| | | | | |
|---|---|---|---|---|
| 7,092,410 | B2 * | 8/2006 | Bordonaro | H04L 69/16 |
| | | | | 370/516 |
| 9,686,169 | B2 * | 6/2017 | Formby | H04L 43/0852 |
| 11,502,922 | B2 * | 11/2022 | Yadav | H04L 41/0893 |
| 11,533,526 | B2 * | 12/2022 | Garvey | H04N 21/4305 |
| 11,943,494 | B2 * | 3/2024 | Garvey | H04N 21/23406 |
| 2005/0123003 | A1 * | 6/2005 | Bordonaro | H04L 41/5009 |
| | | | | 370/516 |
| 2014/0301215 | A1 * | 10/2014 | Somoskoi | H04L 43/0852 |
| | | | | 370/252 |
| 2016/0142274 | A1 * | 5/2016 | Mulkey | H04L 43/0823 |
| | | | | 709/224 |
| 2018/0295050 | A1 * | 10/2018 | Lee | H04L 43/04 |
| 2024/0196028 | A1 * | 6/2024 | Garvey | H04N 21/242 |

FOREIGN PATENT DOCUMENTS

| | | | | | |
|---|---|---|---|---|---|
| EP | 3293919 | A1 * | 3/2018 | | H04L 47/10 |
| WO | WO-2017085024 | A1 * | 5/2017 | | H04N 21/242 |
| WO | WO-2020097200 | A1 * | 5/2020 | | H04L 43/045 |
| WO | WO-2022128898 | A1 * | 6/2022 | | H04N 21/2187 |

* cited by examiner

*Primary Examiner* — Frantz Coby
(74) *Attorney, Agent, or Firm* — Chernoff, Vilhauer, McClung & Stenzel, LLP

(57) ABSTRACT

Devices, systems and methods for determining the amount of latency between a video core and a remote device by inserting null packets in a data stream between the video core and the remote device, the null packets including respective time stamps demarking respective times of departure from the video core.

9 Claims, 3 Drawing Sheets

INTEGRATED NETWORK EVALUATION TROUBLESHOOTING TOOL

CROSS REFERENCE TO RELATED APPLICATIONS

The present application claims priority to U.S. Provisional Application No. 63/314,442 filed Feb. 27, 2023, the content of which is incorporated herein by reference in its entirety.

BACKGROUND

The subject matter of this application generally relates to communications networks that exchange packets between a source and a destination.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content terminates as RF signals over coaxial cables, but is transmitted over the bulk of the distance between the content provider and the subscriber using optical signals. Specifically, CATV networks include a head end at the content provider for receiving signals representing many channels of content, multiplexing them, and distributing them along a fiber-optic network to one or more nodes, each proximate a group of subscribers. The node then de-multiplexes the received optical signal and converts it to an RF signal so that it can be received by viewers. The system in a head end that provides the video channels to a subscriber typically comprises a plurality of EdgeQAM units operating on different frequency bands that are combined and multiplexed before being output onto the HFC network.

A traditional HFC architecture includes a head end having a Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the video delivery system in a single platform called the Converged Cable Access Platform (CCAP).

In these traditional HFC architectures, the video is modulated onto the RF network by a video Edge QAM (VEQ). A VEQ receives Internet-Protocol (IP) encapsulated Single & Multiple Program Transport Streams (SPTSs & MPTSs) from various sources (unicast/multicast) and, after removing any jitter from the network ingress stream, statically or dynamically maps these streams onto a QAM channel via one or more ports of the VEQ, remapping program identifiers (PIDs), while multiplexing as necessary individual SPTSs into a single MPTS. The VEQ may also perform local encryption of the video's elementary streams (ESs). To deliver an MPTS stream onto a QAM channel in accordance with ISO 13818-1 requires that the VEQ recover the ingress Program Clock Reference (PCR) values encoded within each SPTS and re-stamp it with the VEQ's internal 27 MHz clock so that all streams are delivered with the same time base.

As networks have expanded and head ends have therefore become increasingly congested with equipment, many content providers have recently used distributed architectures to spread the functionality of the CMTS/CCAP throughout the network. This distributed architecture keeps the cable data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is Remote PHY (R-PHY) distributed access architecture that relocates the physical layer (PHY) of a traditional CMTS or CCAP—including the VEQs—by pushing the physical layer to the network's fiber nodes. Thus, while the core in the CMTS/CCAP performs the higher layer processing, the R-PHY device in the node converts downstream video data packets sent by the core from digital to analog to be transmitted on radio frequency, and also converts the upstream RF data sent by cable modems from analog to digital format to be transmitted optically to the core. Another distributed access architecture is Remote MAC PHY (R-MACPHY) where, not only is the physical layer of the traditional CMTS pushed into the network, but the functionality Media Access Control (MAC) layer, which is one of the two layers that constitute the data link layer of a transport stream, is also assigned to one or more nodes in the network in what is called a Remote MACPHY device (RMD).

In DAA architectures, it is therefore the remote video capable devices, such as an RMD and RPD (collectively RxD), that include the VEQs that modulate a fully formed MPTS stream, sent by a core, onto the RF network. One benefit of this arrangement is that RMD/RPD devices are generally lower power than a traditional Video Edge QAMs located in a head end, and need lower computational and memory resources. Similar to a VEQ located in a head end, a VEQ located in an RPD/RMD must map and modulate an IP-encapsulated, fully formed MPTS video stream it receives from a head end onto one or more QAM channels (one stream per channel), removing network jitter in the process. The difference relative to a VEQ in a head end, however, is that a VEQ in a remote device only receives a fully-encapsulated MPTS stream, hence does not need to multiplex together various SPTS content.

Also, in DAA architectures, however, because the functionality of the CMTS/CCAP is divided between a core in the head end and various PHY or MACPHY devices throughout the network, protocols must be established to accurately preserve the timing of reconstructed video data that is communicated throughout the network. Thus, even though a remote device only receives MPTS video data already synchronized together, the remote device still must account for any difference between the clock rate at which it receives data and the clock rate at which it outputs data. For example, the DAA remote device may not be synchronized to the same time base as that of the CCAP core (asynchronous operation), or even where the CCAP core and the remote device are synchronized to a common clock (synchronous operation) the CCAP core and the remote device may lose their timing lock.

According to DOCSIS specifications and RxD product implementations, input video dejitter buffers are much smaller, by an order of magnitude or more, than legacy edge QAM devices. As a result, networks must have much better performance with respect to jitter in DAA applications, where the video core such is separated from the RxD by some portion of the customer's existing network infrastructure. Debugging performance issues in such networks is challenging since the RxDs are in nodes distributed across the customer's outside plant and there are not any existing tools that are effective to characterize the intervening network between any given RxD and the video core serving it. In many deployments, this has proven to be a significant issue as video cores are centralized and service RxDs that are located as much as 1500 miles from the core, often connected together using leased network infrastructure.

What is desired therefore, are improved systems and methods for collecting performance data for networks connecting a video core to a remote device.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
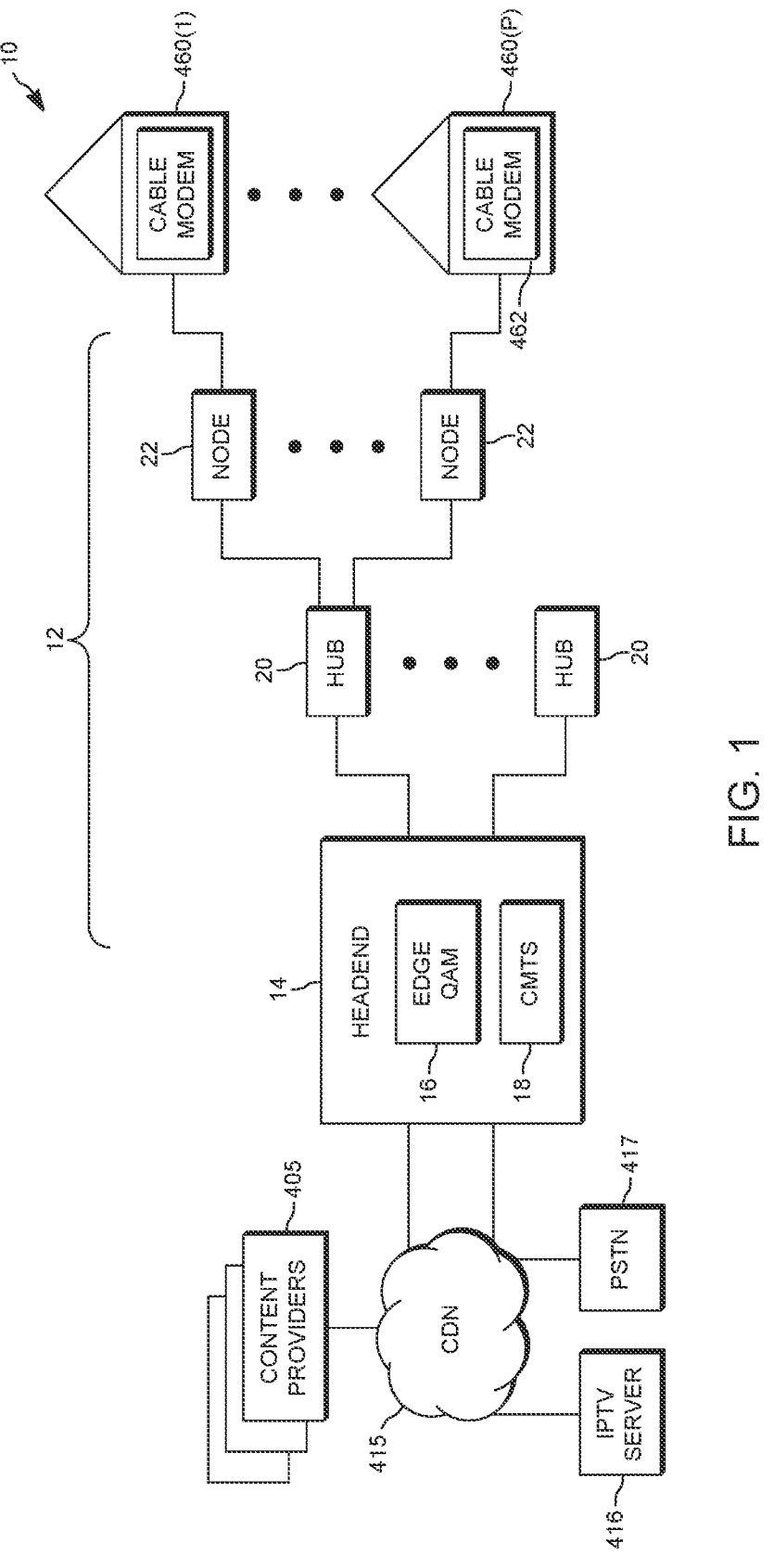
FIG. 1 shows an exemplary traditional HFC architecture having video EQAM units, which package MPTS transport streams to send to downstream nodes.

As noted previously, video EQAM (VEQ) devices are used to receive a large number of channels of video, and output an RF-modulated (i.e. QAM or quadrature amplitude modulated) signal combining the multiple different channels that the VEQ receives. FIG. 1, for example, shows a traditional architecture 10 by which an HFC network 12 includes a head end 14 that delivers content to subscriber equipment 24 as subscriber premises, shown in the figure as a cable modem but those of ordinary skill in the art will understand that subscriber equipment could include set-top boxes, gateways, wireless phones, computers, etc.

The HFC network 12 includes a head end 14, a plurality of hubs 20, and associated with each hub, a plurality of nodes 22 and a plurality of subscriber equipment 24 such as cable modems. The head end 14 typically includes a cable modem termination system (CMTS)13 and a plurality of video EQAM units 16. Each of the nodes 22 has one or more corresponding access points, and each subscriber may have one or more corresponding network elements 24, shown in FIG. 1 as a cable modem.

As also noted previously, in these traditional HFC architectures 10, video is modulated onto the RF network by VEQs 16, which receives Internet-Protocol (IP) encapsulated Single & Multiple Program Transport Streams (SPTSs & MPTSs) from various sources (content providers, etc.) through content delivery network 26. The content delivery network is typically a switching network by which packetized IP data is routed from one address to another and may exhibit unpredictable and variable delays in the packets received. Therefore, the VEQ 16 preferably removes this jitter from the network ingress stream before mapping and modulating the video data onto a plurality of QAM channels. As also noted earlier, to deliver an MPTS stream onto a QAM channel in accordance with ISO 13818-1 requires that the VEQ recover the ingress Program Clock Reference (PCR) values encoded within each SPTS and re-stamp it with the VEQ's internal 27 MHz clock so that all streams are delivered with the same time base.

Figure 2:
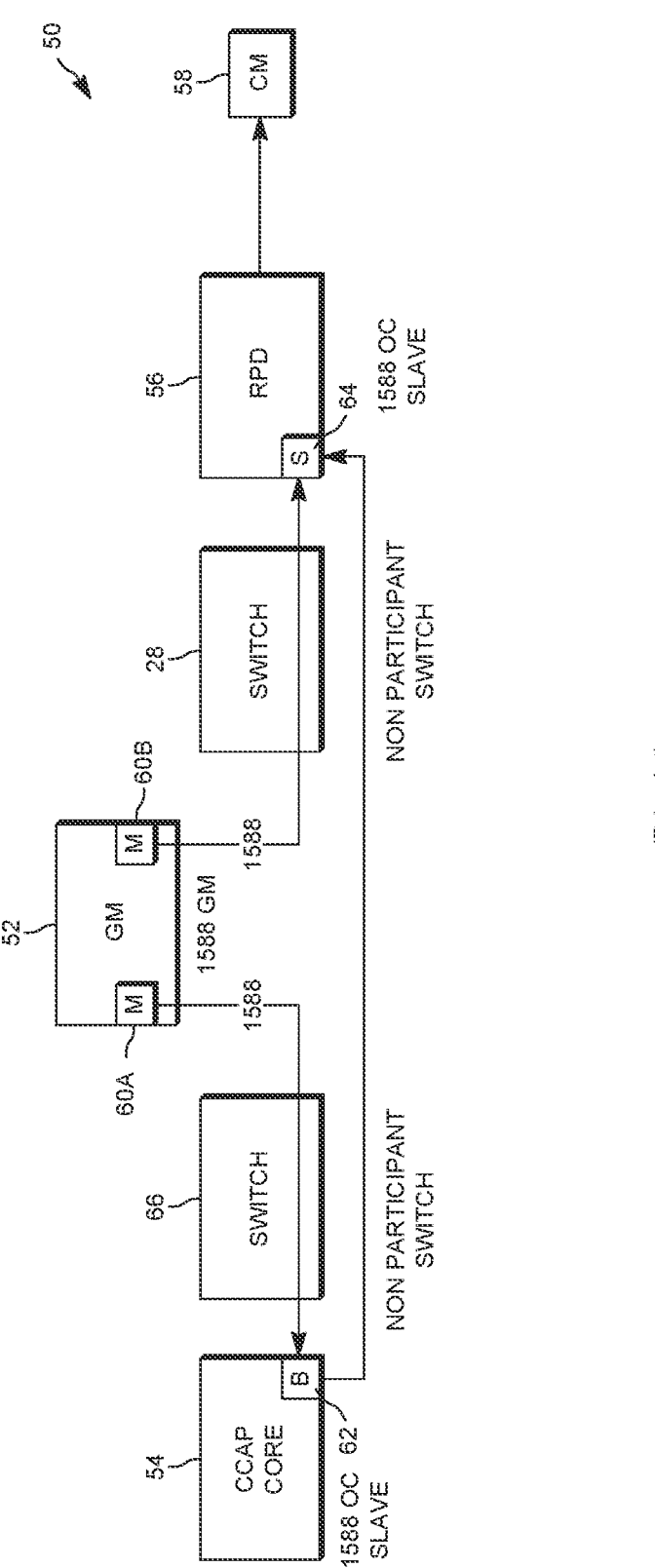
FIG. 2 shows an exemplary R-PHY system where both a CCAP core and its RPDs are timing slaves to an external grandmaster clock (GM).

FIG. 2 shows an alternate distributed access architecture (DAA) in which the functionality of the VEQ is moved to a node. Specifically, FIG. 2 shows what is known as n Remote-Physical Architecture (R-PHY) 50 in which a video/CCAP core 54 sends data to a Remote Physical Device (RPD) 56, which is in turn connected to one or more "consumer premises equipment" (CPE) devices 18 such as a set-top box, cable modem, etc. Though an R-PHY architecture is illustrated in FIG. 2, it should be understood that the description herein is equally applicable to other DAA architectures, such as R-MACPHY architectures, for example. In some embodiments, a timing grandmaster device 52 may be available to provide timing information to both the video/CCAP core 54 and the RPD 56. Specifically, the timing grandmaster 52 has a first master port 60a connected to a slave clock 62 in the CCAP core 54 and a second master port 60b connected to a slave clock 64 in the RPD 56, though alternatively the respective slave clocks of the CCAP core 54 and the RPD 56 may both be connected to a single master port in the timing grandmaster device 52. The CCAP core 54 may be connected to the timing grandmaster 52 through one or more switches 66 while the RPD 56 may be connected to the timing grandmaster 52 through one or more switches 68. Although FIG. 2 shows only one RPD 56 connected to the timing grandmaster 52, many such RPDs may be simultaneously connected to the grandmaster 52, with each RPD having a slave clock 64 receiving timing information from a port 60b in the grandmaster clock 52.

Even though the architecture of FIG. 2 shows a common grandmaster device 52 capable of synchronizing the video/CCAP core 54 to the RPD 56, the architecture of FIG. 2 may be also configured to operate asynchronously, where the grandmaster device 52 does not send common timing information to the core 54/RPD 56. For example, the RPD 56 may be configured to operate asynchronously if the video/CCAP core 54 does not support IEEE1588 timing protocols, or if the RPD 56 is desired to be more resilient to holdover periods in the case the RPD and/or the core loses connection to the timing grandmaster. Moreover, in an R-MACPHY system, an RMD will typically be set to async mode by default to eliminate the need for 15888 timing, since DOCSIS services do not need it although the RMS may instream be switched to sync mode if other services such as wireless backhaul requires IEEE 1588 services, or if the oscillator of the video core 54 is of poor quality and needs an externa; timing source. Therefore, the system shown in FIG. 2 may be configured to either operate in sync mode or in async mode to process video content, and the video/CCAP core 54 and RPD (RMD) 55 each therefore preferably include hardware capable of operating in either mode, with software that enables configuration by a video core of itself and connected downstream devices into either alternate one of these modes when setting up video channels.

Figures 3A, 3B:
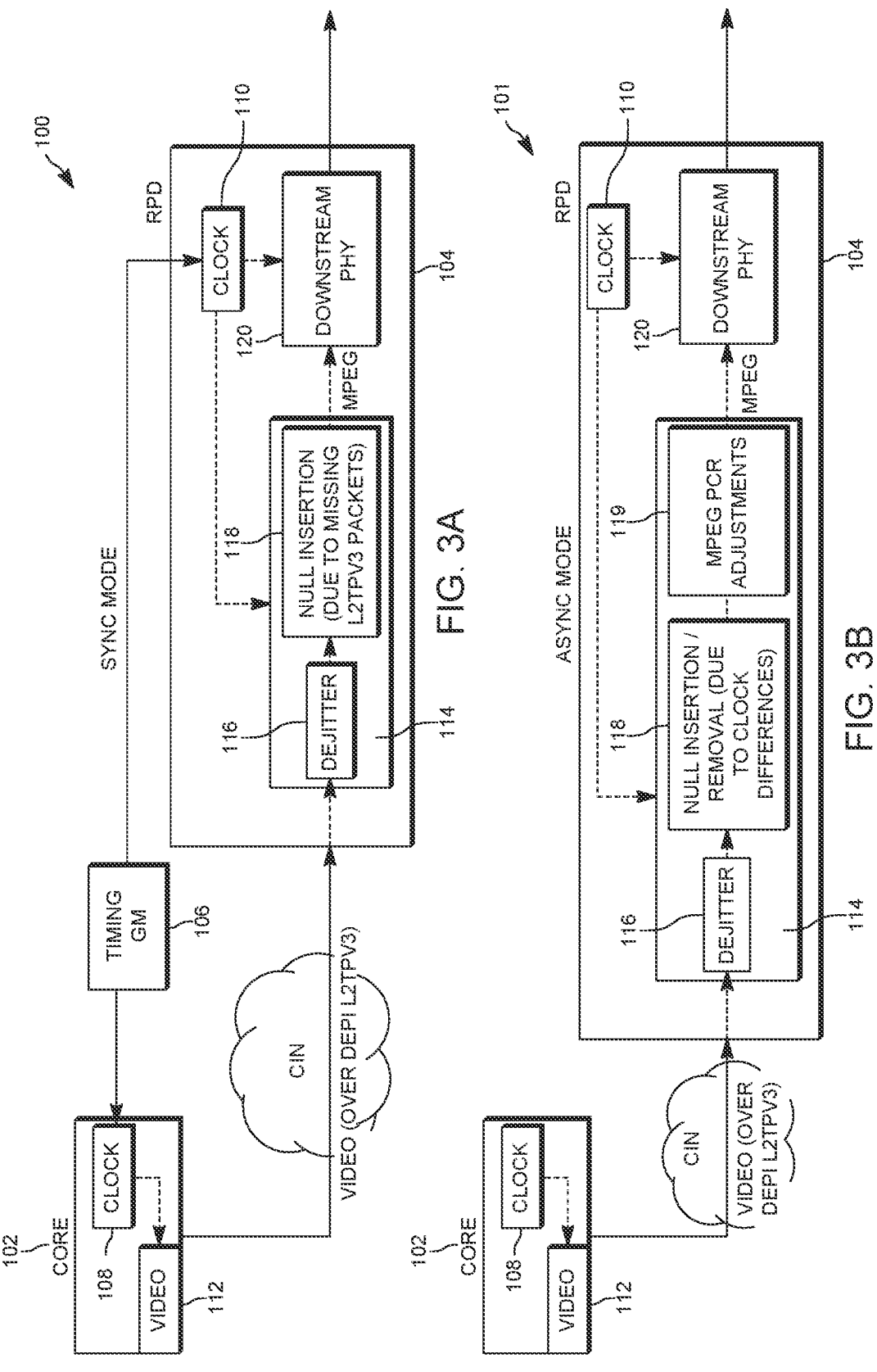
FIG. 3A shows an architecture where a video core transmits video data to an RPD in sync mode.
FIG. 3B shows an architecture where the video core of FIG. 2 transmits video data to the RPD of FIG. 2 in async mode.

In sync (synchronous) mode, the RPD (or RMD) and its video core are synchronized in time to the same reference clock. In this sync mode, the RPD is required merely to detect lost video packets using the Layer 2 Tunneling Protocol v. 3 (L2TPv3) sequence number monitoring, and insert MPEG null packets for each missing packet. FIG. 3A, for example, shows a system in a first configuration 100 where a video core 102 communicates with an RPD 104 in synchronous mode using a common grandmaster timing server 106. The timing server 106 maintains an identical timing lock (i.e. frequency and phase) with both the clock 108 in the video core 102 and the clock 110 in the RPD 104. The video core 102 has a video streamer 112 that forwards video data packet to the RPD 104 via a Downstream External PHY Interface (DEPI) using L2TPv3. The video packets sent from the video core 102 to the RPD 104 will typically include all information necessary to decode the packetized elementary video transport stream, such as Program Identifiers (PIDs), Program Clock Reference (PCR) data, etc.

The RPD 110 in turn, receives the video packets sent from the video core 108 in a dejitter buffer 116 of a processing device 114. The dejitter buffer 116 receives and outputs packet data at a rate that removes network jitter resulting from differing paths of received packet data, or other sources of varying network delay between the video core and the RPD. Because some packets sent by the video streamer 112 may be lost or misplaced during transport to the RPD 104, the packets output from the dejitter buffer 116 may preferably be forwarded to a module 118 that, in the case of sync mode, inserts null packets in the data stream to account for those lost packets, so as to maintain the proper timing rate of the transmitted video. The transport stream, with any necessary insertion of null packets is then forwarded to a PHY device 120, which may decode the packetized elementary stream into a sequence of decoded video frames for downstream delivery to end-users by outputting QAM-modulated data in a format expected by customer-premises equipment, like set-top boxes. Alternatively, the PHY device may simply forward the packetized data, without decoding, to e.g. a cable modem for decoding by a user device such as a computer, tablet, cell phone, etc.

In sync mode, because the RPD 104 and its Video Core 102 must be synchronized to the same reference clock, the frequency of the PCR clock contained within the ingress MPTS matches that of the local clock on the remote device. Therefore, there is no frequency offset on the RPD between the ingress and egress streams, and as noted earlier, to maintain proper timing information in the video data being transmitted, the RPD 104 need only remove network jitter, detect lost video packets using the L2TPv3 Sequence number monitoring, and insert MPEG NULL packets for each missing packet.

Alternatively, however, the RPD and video core may be configured to operate in an asynchronous (async) mode. In async mode, the RPD 104 and its video core 102 are not synchronized in time to the same reference clock. Instead, the RPD 104 is required to detect the difference between its own clock 110 and the clock 108 of the video core 102 and be able to either insert or remove MPEG packets as necessary to maintain expected MPEG bitrate, and also adjust the MPEG PCR values due to the removal/insertion of the MPEG packets.

FIG. 3B, for example, shows the hardware of FIG. 2 configured to instead operate in async mode. In this configuration 101, the clock 108 of the video core 102 and the clock 110 of the RPD 104 are not synchronized and may therefore drift relative to each other. The video streamer 112 of the video core 102 forwards packets of the packetized video data elementary stream to the RPD 104, which again receives the data in dejitter buffer 116 to remove network jitter, as described previously. However, unlike the configuration of FIG. 2, the packets output from the dejitter buffer

116 are forwarded to the module 118 which both adds null packets when needed, and drops packets when needed, in order to maintain the proper constant bit rate of the data received from the dejitter buffer 116.

Further, because the RPD and its video core are not synchronized in time to the same reference clock, the frequency of the PCR in the ingress MPTS will be offset from that of local RPD clock. Thus, as well as performing the above functions common to those performed in sync mode, the RPD must also detect the magnitude of the frequency offset from the video core and correct for it. To this end, after packets are added/dropped as needed, a PCR module 119 re-stamps the data packets with updated PCRs due to the removal/insertion of MPEG packets before forwarding the re-stamped packets to the PHY device 120.

Regardless of which mode of operation (sync or async), the video transport stream to the remote device will typically include many null packets. These null packets are often inserted by an encoder to maintain a constant bitrate of video being delivered. In sync mode, the RPD will add more null packets to account for those dropped in transit. In async mode, the RPD will also add null packets when necessary to account for lost packets, but will also drop packets as necessary and preferably will first drop null packets to avoid lost data.

Embodiments of the present disclosure take advantage of these null packets that occur in all MPEG transport streams, embedding an accurate timestamp into the null packets reflecting the time that they are output from the video core 102 onto the network. The RPD 104 (or RMD etc.) may also mark the arrival time of these null packets using its own accurate clock. The sent and received timestamps may be added to a log, which may then provide an accurate metric of the network latency encountered by that null packet. Since each video multiplex typically includes many null packets, collecting this information over time would provide sufficient data to determine both latency and jitter experienced by the null packets of a Multiprogram Transport Stream (MPTS) over a network, and such metrics can be tracked/plotted over time, indicating when video packets are delivered on-time and reliably, and when they are not. In some embodiments, monitoring the timing data in the null packets may be used to trigger alarms indicating network issues, well before subscribers noticed video problems.

In embodiments where IEEE 1588 PTP timing is required, the clocks used to mark the null packets would preferably be the clocks used by the video core and the RPD, respectively. In RMD networks where PTP is optional, proper NTP synchronization of both the video core and the RMD would be sufficiently accurate to monitor network latency and jitter.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An apparatus configured for operation in a distributed access architecture having a remote device connected to a video core and having a dejitter buffer, the remote device configured to remove null packets from the dejitter buffer, where the apparatus uses information in the null packets to determine an amount of latency between the remote device and the video core.

2. The apparatus of claim 1 where the information in the null packets comprises time stamp information.

3. The apparatus of claim 1 where the time stamp information includes a time that the null packet was sent from the video core to the remote device.

4. The apparatus of claim 1 where the time stamp information includes a time that the null packet arrived at the remote device.

5. A remote device connected to a video core in a distributed access architecture and having a dejitter buffer, the dejitter buffer receiving a null packet in a video stream from the video core, the remote device configured to extract a first time stamp from the null packet and associate a second time stamp with the first time stamp, the second time stamp indicating a time of arrival of the null packet at the remote device.

6. The remote device of claim 5 configured to store the first time stamp and the second time stamp in a log.

7. A method for determining at least one of latency and jitter experienced in a network connection between a video core and a remote device of a distributed access architecture, the method comprising:

(a) inserting, by a video core, a second time stamp in a field of a null packet contained within an MPEG transport stream;

(b) sending, by a video core, the MPEG transport stream to a remote device in a distributed access architecture;

(c) determining, by the remote device, a time of arrival of the null packet using a second time stamp;

(d) recording, by the remote device, the first time stamp and the second time stamp in a log;

(e) repeating steps (a) to (d) for a plurality of null packets in the MPEG transport stream; and (f) using the time stamps in the log to measure at least one of latency and jitter in the network connection.

8. The method of claim 7 where the second time stamp is based on a clock in the remote device.

9. The method of claim 7 where the second time stamp is based on synchronization data sent from the video core.

* * * * *